US009267377B2

(12) United States Patent
Weiberle et al.

(10) Patent No.: US 9,267,377 B2
(45) Date of Patent: Feb. 23, 2016

(54) COUPLING DEVICE FOR CONNECTING A BRAKE INPUT ELEMENT TO A MAIN BRAKE CYLINDER AND METHOD FOR OPERATING SUCH A COUPLING DEVICE

(75) Inventors: Reinhard Weiberle, Vaihingen/Enz (DE); Timo Jahnz, Hessigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 596 days.

(21) Appl. No.: 13/810,830

(22) PCT Filed: May 30, 2011

(86) PCT No.: PCT/EP2011/058803
§ 371 (c)(1),
(2), (4) Date: Mar. 29, 2013

(87) PCT Pub. No.: WO2012/019802
PCT Pub. Date: Feb. 16, 2012

(65) Prior Publication Data
US 2013/0199364 A1 Aug. 8, 2013

(30) Foreign Application Priority Data

Jul. 27, 2010 (DE) .......................... 10 2010 038 439
Oct. 20, 2010 (DE) .......................... 10 2010 042 694

(51) Int. Cl.
*B60T 8/44* (2006.01)
*F01B 31/00* (2006.01)
(Continued)

(52) U.S. Cl.
CPC . *F01B 31/00* (2013.01); *B60L 7/18* (2013.01); *B60L 7/26* (2013.01); *B60T 1/10* (2013.01);
(Continued)

(58) Field of Classification Search
CPC ....... B60T 7/042; B60T 11/32; B60T 13/745; B60T 8/4077
USPC ................................ 303/114.1; 188/358–360
See application file for complete search history.

(56) References Cited

U.S. PATENT DOCUMENTS 5,094,079 A * 3/1992 Leigh-Monstevens . B60T 13/66
192/3.58
8,459,753 B2 * 6/2013 Vollert .................. B60T 13/745
303/114.1

(Continued)

FOREIGN PATENT DOCUMENTS

DE 195 02 925 8/1996
DE 10 2005 024577 11/2006
(Continued)

OTHER PUBLICATIONS

International Search Report for PCT/EP2011/058803, dated Feb. 1, 2012.
(Continued)

*Primary Examiner* — Christopher Schwartz
(74) *Attorney, Agent, or Firm* — Kenyon & Kenyon LLP (57) ABSTRACT

A coupling apparatus has an input piston disposable on a braking input element and an output piston disposable on a brake master cylinder, to which a driver braking force is transferable via the input piston. In a first operating mode, the input piston displaced out of its initial position over a brake application distance less than a first minimum brake application distance, is spaced apart from the output piston. In a second operating mode, the input piston displaced out of its initial position over a brake application distance less than a second minimum brake application distance, is spaced apart from the output piston, and the driver braking force is transferable via the input piston to the output piston.

20 Claims, 3 Drawing Sheets

(51) Int. Cl.

| | | |
|---|---|---|
| | *B60L 7/18* | (2006.01) |
| | *B60L 7/26* | (2006.01) |
| | *B60T 1/10* | (2006.01) |
| | *B60T 7/04* | (2006.01) |
| | *B60T 7/10* | (2006.01) |
| | *B60T 8/40* | (2006.01) |
| | *B60T 13/66* | (2006.01) |
| | *B60T 13/68* | (2006.01) |
| | *B60T 13/74* | (2006.01) |

(52) U.S. Cl.
CPC ............... *B60T 7/042* (2013.01); *B60T 7/107* (2013.01); *B60T 8/4077* (2013.01); *B60T 13/662* (2013.01); *B60T 13/686* (2013.01); *B60T 13/745* (2013.01); *B60L 2240/12* (2013.01); *B60L 2250/10* (2013.01); *B60T 2220/04* (2013.01)

(56) References Cited

U.S. PATENT DOCUMENTS

| | | | | |
|---|---|---|---|---|
| 8,899,696 | B2 * | 12/2014 | Weiberle | B60T 13/745 303/113.4 |
| 8,997,482 | B2 * | 4/2015 | Richard | B60T 13/745 60/545 |
| 2009/0039702 | A1 | 2/2009 | Nishino et al. | |
| 2010/0114444 | A1 * | 5/2010 | Verhagen | B60T 7/042 701/70 |
| 2010/0126167 | A1 * | 5/2010 | Nagel | B60T 13/745 60/545 |

FOREIGN PATENT DOCUMENTS

| | | |
|---|---|---|
| DE | 10 2006 030168 | 1/2007 |
| DE | 10 2006 056907 | 12/2007 |
| DE | 10 2006 040424 | 3/2008 |
| DE | 10 2007 016862 | 10/2008 |
| DE | 10 2008 038320 | 5/2009 |
| DE | 10 2008 001061 | 10/2009 |
| DE | 10 2008 001522 | 11/2009 |
| DE | 10 2009 033499 | 1/2010 |
| DE | 10 2009 047263 | 6/2010 |
| EP | 0 389 993 | 10/1990 |
| EP | 2 019 010 | 1/2009 |
| JP | 6-191395 | 7/1994 |
| JP | 2005-532220 | 10/2005 |
| JP | 2007-283820 | 11/2007 |
| JP | 2008-137648 | 6/2008 |
| JP | 2010-149845 | 7/2010 |
| JP | 2012-512780 | 6/2012 |
| WO | WO 2010/069656 | 6/2010 |
| WO | WO 2010/069740 | 6/2010 |

OTHER PUBLICATIONS http://en.wikipedia.orglwiki/Brake-by-wire**.

* cited by examiner

COUPLING DEVICE FOR CONNECTING A BRAKE INPUT ELEMENT TO A MAIN BRAKE CYLINDER AND METHOD FOR OPERATING SUCH A COUPLING DEVICE

BACKGROUND OF THE INVENTION

1. Field of the Invention

The present invention relates to a coupling apparatus for connecting a braking input element to a brake master cylinder of a vehicle, and to a method for operating a coupling apparatus of this kind.

2. Description of the Related Art

Electric and hybrid vehicles have a braking system designed for regenerative braking, having an electric motor operated in generator mode in the context of regenerative braking. The electrical energy recovered upon regenerative braking is preferably used, after temporary storage, to accelerate the vehicle. It is thereby possible to reduce a power dissipation exhibited by a conventional vehicle when frequently braking during a journey, as well as the energy consumption and pollutant emissions of the electric or hybrid vehicle.

Operation of the electric motor, for example the electric drive motor, in generator mode usually requires, however, a specific minimum vehicle speed. A regenerative braking system is thus frequently incapable of exerting a generator-mode braking torque on the wheels of the vehicle for a long enough time for the forward-traveling vehicle to be at a standstill. A hybrid vehicle therefore often also has, in addition to the regeneratively operated electric motor, a hydraulic braking system with which the absent braking effect of the regenerative brake can be compensated for at least in a low-speed range. In this case even if an electrical energy reservoir is full, a circumstance in which the regenerative brake usually does not exert a braking torque on the wheels, the entire braking torque can be applied via the hydraulic braking system.

On the other hand, it is desirable in many situations to exert the least possible hydraulic braking force on the wheels in order to achieve a high degree of regeneration. After shifting operations, for example, the decoupled generator is often activated as a regenerative brake in order to ensure reliable charging of the temporary reservoir and a high level of energy savings.

A driver generally prefers a total braking torque for his or her vehicle that corresponds to his or her actuation of a braking input element, for example his or her actuation of the brake pedal, irrespective of activation or deactivation of the regenerative brake. Many electric and hybrid vehicles therefore have an automatic system that is intended to adapt the braking torque of the hydraulic braking system to the current braking torque of the regenerative brake in such a way that a desired total braking torque is maintained. The driver him- or herself therefore need not take on the task of the deceleration controller by adapting the actuation of the braking input element to the current braking torque of the regenerative brake. Examples of an automatic system of this kind are brake-by-wire braking systems, in particular EHB systems, such as those described e.g. at http://en.wikipedia.org/wiki/Brake-by-wire.

BRIEF SUMMARY OF THE INVENTION

The present invention offers a coupling apparatus that is usable in the first operating mode as an unlinking apparatus for unlinking the braking input element from the brake master cylinder, and in the second operating mode as a linking apparatus for linking the braking input element to the brake master cylinder. The result is that in the first operating mode, an internal pressure of the brake master cylinder is not increased despite an actuation of the braking input element by which the input piston is displaced out of its initial position over a brake application distance less than the predefined first minimum brake application distance. In the second operating mode, conversely, the driver can already apply braking directly into the brake master cylinder upon an actuation of the braking input element, by way of which actuation the input piston is displaced out of its initial position over the displacement distance between the predefined second minimum brake application distance and the first minimum brake application distance.

The method according to the present invention correspondingly offers the capability of using a coupling apparatus selectably as an unlinking apparatus for unlinking a braking input element from a brake master cylinder, and as a linking apparatus for linking a braking input element to the brake master cylinder. The method furthermore ensures, in the context of selection of the current operating mode of the coupling apparatus as an unlinking apparatus or a linking apparatus, that the updated operating mode is the operating mode that is more advantageous in terms of actuation of the braking input element, the present state of the vehicle, and/or the instantaneous driving style of the vehicle.

At the same time, the coupling apparatus according to the present invention and the corresponding method offer the advantages of a brake-by-wire system. In both the first operating mode and the second operating mode, the possibility exists of establishing the internal pressure in the brake master cylinder independently of actuation of the braking input element. Unlinking can likewise be used to blend a regenerative braking torque of a regeneration-capable braking system.

A further advantage of the technology according to the present invention is the fact that in both the first operating mode and the second operating mode, the input piston contacts the output piston in the context of a (longer) actuation of the braking input element, i.e. after the first minimum brake application distance or the second minimum brake application distance has been covered, and the driver braking force exerted on the braking input element is thus transferred via the input piston to the output piston. In the context of such an actuation of the braking input element, the force exerted by the driver on the braking input element can thus be used to increase the brake pressure in the brake master cylinder. The technology according to the present invention thus makes it possible to use a braking device whose performance and energy consumption need to meet less-stringent requirements than an external-force braking device of a brake-by-wire system. At the same time, the usable braking device, which is used as an external-force brake or as an assisted brake depending on an operating mode, ensures safe deceleration of a vehicle. The comparatively high costs of a brake-by-wire system are thus eliminated with the present invention. In addition, the direct force transfer from the braking input element to the output piston via the input piston, in the context of a brake application distance of at least the second minimum brake application distance, raises the safety standard of the vehicle equipped therewith.

The present invention is usable for a regeneration-capable and/or braking-force-boosted braking system. In particular, it offers the capability of ascertaining, by way of a sensor or an estimate, the total braking torque that is desired by the driver and/or by a control system of the vehicle, and the current regenerative braking torque being exerted by the regenerative brake. It is then possible to ascertain a difference between the desired total braking torque and the regenerative braking torque, which is actively defined, after unlinking of the braking input element, by establishing a corresponding internal pressure in the brake master cylinder. This allows the (time-variable) regenerative braking torque to be blended with no need for the driver to perform additional work for that purpose. No expensive electronics are necessary for embodying the method steps described in this paragraph. Sufficient regeneration efficiency at reasonable cost is thus ensured when the present invention is used. Advantageously, the method steps described here can in addition be executed so rapidly that rapid reaction is possible to a change over time in the regenerative braking torque, by correspondingly reducing or elevating the internal pressure in the brake master cylinder.

In an advantageous embodiment, the coupling apparatus encompasses an external-force braking device by way of which an external force is additionally transferable to the output piston in such a way that the internal pressure in the brake master cylinder is increasable by way of the external force transferred to the output piston. By way of an external-force braking device of this kind, which can also be referred to as a brake booster, a desired internal pressure can easily be actively established in the brake master cylinder. A controllable brake booster, such as in particular an electromechanical brake booster, is usable, for example, as a suitable external-force braking device. A generator braking torque of an electrical generator can thus be recovered by way of the external-force braking device, in particular when the brake pedal is unlinked. In addition, the external-force braking device can also be used to reduce the force that needs to be applied by a driver in order to decelerate the vehicle to a halt.

In particular, the output piston can be displaceable by way of the external-force braking device at a first maximum displacement speed that is less than a second maximum displacement speed of the input piston displaced out of its initial position, so that by way of an actuation of the braking input element at a maximum actuation speed at which the input piston is displaceable at the second maximum displacement speed, the coupling apparatus is conveyable automatically out of the first operating mode into the second operating mode. The coupling apparatus is thereby, upon an actuation of the braking input element in accordance with a displacement speed greater than a predefined limit displacement speed, automatically conveyed into the second operating mode (linking mode). A rapid actuation of the braking input element thus automatically brings about earlier contacting of the output piston by the input piston, and thus an intensified (earlier) transfer of the driver braking force for brake application into the brake master cylinder.

The external-force braking device can also be designed so that in the first operating mode, it displaces the output piston at a first speed less than the predefined limit displacement speed, and in the second mode it displaces the output piston at a second speed greater than the limit displacement speed.

The coupling apparatus preferably encompasses a control device with which the coupling apparatus is conveyable, in consideration of at least one variable with respect to an actuation speed of the actuation of the braking input element, a change over time in the actuation speed, the driver braking force, a change over time in the driver braking force, a state of at least one vehicle component of the vehicle, a change over time in the state, at least one driving style of the vehicle, and/or a change over time in the driving style, at least into the first state or into the second operating mode. It is thereby possible to take into account, for example, at least one characteristic brake actuation variable in the context of selectable conveyance of the coupling apparatus at least into the first operating mode or into the second operating mode. Based on the characteristic brake actuation variables listed here, it is possible to detect reliably whether the driver prefers an abrupt deceleration of the vehicle or a slow deceleration of the vehicle. For example, a rapid actuation of the brake input element, a sudden acceleration in braking input element actuation, a comparatively large driver braking force, and a rapid increase in driver braking force indicate that the driver desires abrupt deceleration of the vehicle. In this case, using the technology according to the present invention, the driver braking force already becomes transferred to the output piston in the context of a small brake application distance, and is thus utilized to increase the internal pressure in the brake master cylinder.

The control device can also be designed to take into consideration at least one variable with respect to a state and/or a change over time in the state of a component of a regenerative braking system as the at least one variable. This, too, ensures an advantageous definition of the updated operating mode. One such state variable of a component of the regenerative braking system can be, for example, a charge state of the battery and/or an operating mode of a generator.

The control device can furthermore be designed to take into consideration a vehicle speed, a vehicle direction, a change in vehicle direction, and/or a yaw rate as the at least one variable. The possibility thus exists, in traffic situations and driving situations in which a rapid increase in brake pressure is advantageous, of already transferring the driver braking force exerted by the driver on the actuation element to the output piston for a smaller brake application distance, by conveying the coupling apparatus into the second operating mode.

The control device is preferably designed to control a force transfer component out of a retracted position into at least one extended position in such a way that in the first operating mode a force transfer from the input piston, displaced out of its initial position over a brake application distance between the second minimum brake application distance and the first minimum brake application distance, to the output piston is suppressed by way of the force transfer component controlled into the retracted position, and in the second operating mode the driver braking force is transferable from the input piston, displaced out of its initial position over a brake application distance between the second minimum brake application distance and the first minimum brake application distance, to the output piston via the force transfer component controlled into the at least one extended position. As a result of an extension of the force transfer component, a force transfer connection between the input piston and the output piston can also be created in the context of the second minimum brake application distance. Correspondingly, a retraction of the force transfer component can abolish the force transfer connection between the output piston and the input piston in the context of a braking distance less than the first minimum brake application distance. Conveyance of the coupling apparatus in out of the first operating mode and into at least the second operating mode is thereby easy to execute.

For example, the force transfer component can encompass a multi-step pawl. In this case the coupling apparatus is also conveyable into at least one further operating mode in addition to the first operating mode and the second operating mode.

In a further advantageous embodiment, the coupling apparatus encompasses a hydraulic housing having an internal chamber, at least partly filled with a fluid, into which the input piston and the output piston at least partly project. In this case the possibility exists of advantageously influencing the force counteracting the inward displacement of the input piston.

Advantageously, the internal chamber of the hydraulic housing is hydraulically connected via at least one first conduit to a pedal simulator embodied as a piston-cylinder unit. This is an inexpensively achievable embodiment of an advantageous pedal simulator.

In particular, the pedal simulator embodied as a piston-cylinder unit can have a nonlinear spring characteristic corresponding to a brake characteristic. This ensures a standardized brake feel for the driver upon actuation of the brake actuation element.

In alternative or supplementary fashion, the internal chamber of the hydraulic housing and/or the pedal simulator can be hydraulically connected, via at least one second conduit and a valve, to a counterpressure-free hydraulic fluid storage volume. In this case a pressure buildup in the internal chamber is suppressed after an opening of the valve even upon an inward displacement of the input piston.

In an advantageous refinement, the coupling apparatus encompasses a control device with which the valve is switchable, in consideration of at least one variable with respect to an actuation speed of the actuation of the braking input element, a change over time in the actuation speed, the driver braking force, a change over time in the driver braking force, an actuation of the accelerator pedal, a change over time in the actuation of the accelerator pedal, a change over time in the actuation speed of the actuation of the accelerator pedal, a state of at least one vehicle component of the vehicle, a change over time in the state, at least one driving style of the vehicle, a change over time in the driving style, a traffic situation, and/or an environmental situation, at least into an opened state and into a closed state. This ensures, in particular, the possibility of enabling the driver to actuate the braking input element rapidly and with almost zero force in a hazardous situation, by opening the valve.

The advantages listed in the paragraphs above are also ensured in the context of a braking system having a coupling apparatus of this kind, and of a vehicle having a corresponding coupling apparatus or having such a braking system.

The advantages already recited are moreover achievable by way of a corresponding method for operating a coupling apparatus.

DETAILED DESCRIPTION OF THE INVENTION

Figure 1:
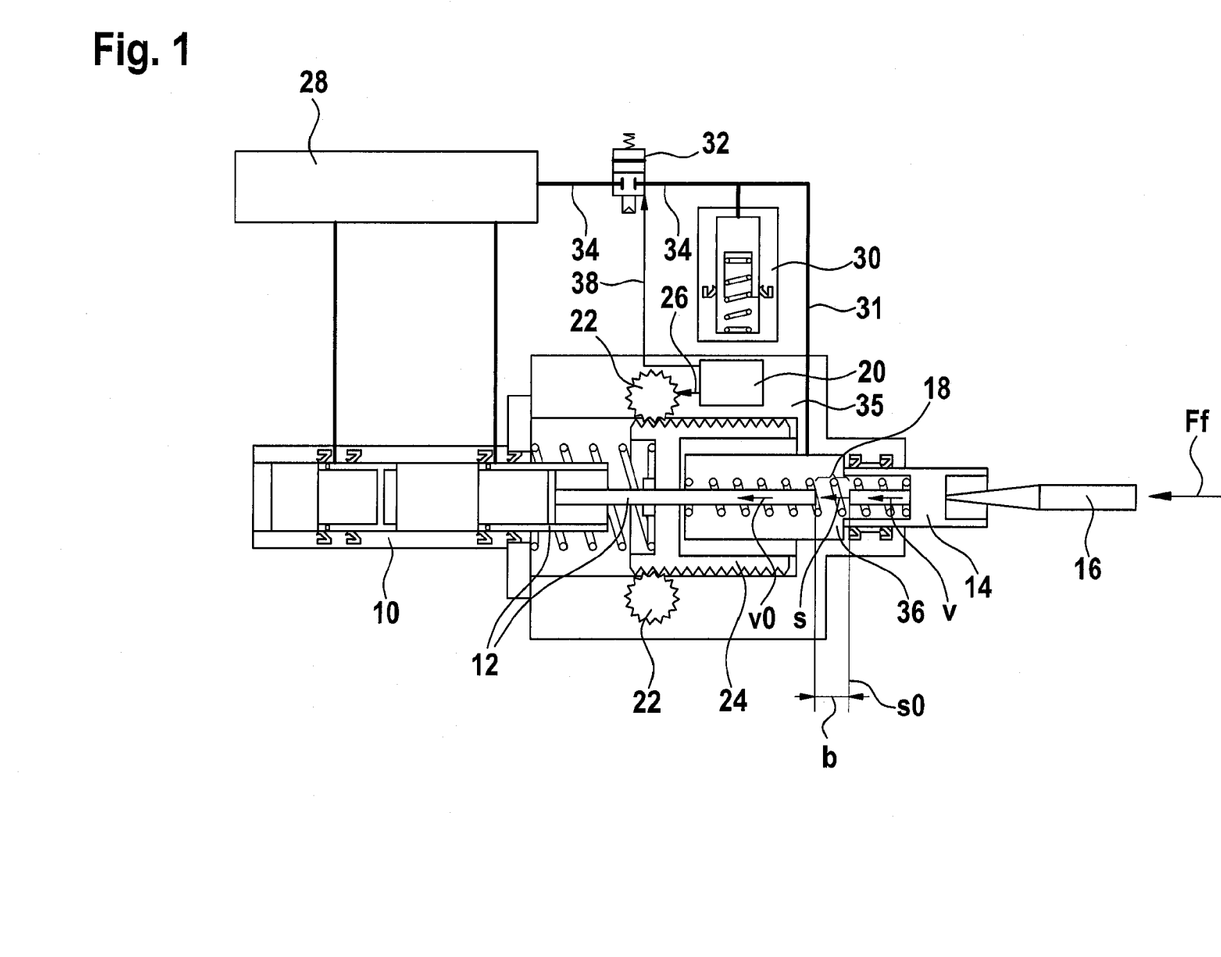
FIG. 1 schematically depicts a first embodiment of the coupling apparatus.

FIG. 1 schematically depicts a first embodiment of the coupling apparatus.

The coupling apparatus schematically reproduced in FIG. 1 has an output piston 12 disposed/disposable on a brake master cylinder 10. By way of an inward sliding of at least a portion of output piston 12 into brake master cylinder 10, a pressure in at least one internal volume of brake master cylinder 10 can be raised. The technology according to the present invention that is described hereinafter is not limited to one specific type of brake master cylinder 10 or of output piston 12.

The coupling apparatus also encompasses an input piston 14 that is disposable/disposed on a braking input element 16 (only partly reproduced) in such a way that upon an actuation of braking input element 16, input piston 14 is displaceable out of an initial position s0 over a brake application distance s. A sensor (not depicted), for example a pedal travel sensor or a force sensor, by way of which an actuation of braking input element 16 can be ascertained, can be attached to braking input element 16. Braking input element 16 can be embodied, for example, as a brake pedal. Be it noted, however, that the ability of the coupling apparatus described here to be embodied does not require a specific embodiment of braking input element 16 or of input piston 14.

Advantageously, initial position s0 of input piston 14 is defined so that a gap 18 is present between the (unactuated) output piston 12 and input piston 14, which is in its initial position s0 when braking input element 16 is not actuated. Another way to describe this is that the two pistons 12 and 14, in their initial positions, do not contact one another when braking input element 16 is not actuated. A force transfer between pistons 12 and 14 that are in their initial position is thus suppressed as a result of gap 18. An unlinking of braking input element 16 from brake master cylinder 10 is thus achievable by way of gap 18 between pistons 12 and 14.

A displacement of input piston 14 out of its initial position s0 over a brake application distance s equal at least to a predefined first minimum brake application distance, on the other hand, causes the two pistons 12 and 14 to contact one another. A driver braking force Ff exerted on braking input element 16 is in this fashion transferable, via input piston 14 displaced out of its initial position s0 over the brake application distance s of at least the first minimum brake application distance, to output piston 12. The transferable driver braking force Ff can be understood as a partial force exerted by the driver on braking input element 16. In addition to driver braking force Ff, the driver can also apply a further partial force onto braking input element 16 in order to overcome the frictional forces counteracting the displacement of braking input element 16 and/or of input piston 14.

As a result of driver braking force Ff transferred via input piston 14 to output piston 12, output piston 12 can be displaced in such a way that the at least one internal volume of brake master cylinder 10 is made smaller, and the internal pressure present therein is thus increased. As a result of the increased internal pressure, a brake pressure of at least one wheel brake cylinder (not illustrated) of at least one brake circuit (not depicted) linkable to brake master cylinder 10 can be increased. In this manner, at least one (hydraulic) braking torque, exertable on the at least one wheel of the vehicle, of the at least one wheel brake cylinder can be built up. Be it noted that the usability of the coupling apparatus described here does not require a specific embodiment of the at least one brake circuit, or a specific type of wheel brake cylinder disposed therein.

The coupling apparatus optionally encompasses an external-force braking device by way of which an external force (not illustrated) is transferrable to output piston 12 in such a way that as a result of the external force transferred to output piston 12, the internal pressure in brake master cylinder 10 can be increased. The external-force braking device can be embodied, for example, as a brake booster, in particular as an electromechanical brake booster and/or as a hydraulic brake booster (i-booster). The external-force braking device is preferably a continuously displaceable/controllable brake booster (active brake booster). Be it noted, however, that the embodiment of the external-force braking device is not limited to the examples of brake boosters listed here.

The external-force braking device can encompass a motorized gear drive 22 (electric motor), controllable by way of a control device 20, with which an assistance piston 24 disposed/disposable on output piston 12 is displaceable in such a way that output piston 12 is displaceable together with assistance piston 24 in order to vary the internal pressure in brake master cylinder 10. In particular, output piston 12 can be displaceable, despite the suppression of force transfer from input piston 14 to output piston 12 spaced apart from input piston 14, by way of the external-force braking device. Further advantageous design possibilities for the external-force device will be discussed in more detail below.

The coupling apparatus of FIG. 1 has a first operating mode in which, during a displacement of input piston 14 out of its initial position s0 over a brake application distance s less than the first minimum brake application distance, input piston 14 is spaced apart from output piston 12 in such a way that a force transfer from input piston 14, displaced out of its initial position s0 over the brake application distance s less than the first minimum brake application distance, to output piston 12 is suppressed. An actuation of braking input element 16 with a comparatively small driver braking force Ff thus brings about a displacement of input piston 14 out of its initial position s0 over a (small) brake application distance s, less than the first minimum brake application distance, that is not sufficient to overcome gap 18. In the first operating mode it is thus assured that the driver applies braking directly into brake master cylinder 10, or into the at least one wheel brake cylinder, only as of at a defined minimum actuation distance defined by the first minimum brake application distance.

In addition, the coupling apparatus is conveyable into at least a second operating mode having a second minimum brake application distance less than the first minimum brake application distance. In the second operating mode of the coupling apparatus, input piston 14 displaced out of its initial position s0 over a brake application distance s less than the second minimum brake application distance is spaced apart from output piston 12 in such a way that a force transfer from input piston 14 to output piston 12 is suppressed. This can also be restated as follows: during a displacement of input piston 14 out of its initial position s0 over the brake application distance s less than the second minimum brake application distance, force transfer from input piston 14 to output piston 12 is suppressed because they are spaced apart. The driver braking force Ff, on the other hand, is transferrable via input piston 14, displaced out of its initial position s0 over a brake application distance s between the second minimum brake application distance and the first brake application distance, to output piston 12.

The second operating mode of the coupling apparatus thus ensures for the driver the possibility of brake application directly into brake master cylinder 10, or into the at least one wheel brake cylinder, after closing up only a shorter takeup distance (the second minimum brake application distance). The braking system having the coupling apparatus conveyed into the second operating mode can thus react more rapidly to the actuation of braking input element 16 by the driver even while dispensing with the use of an electronic system internal to the braking system.

The first operating mode, on the other hand, ensures an advantageous unlinking between braking input element 16 and brake master cylinder 10 with a greater takeup distance (the first minimum brake application distance). The (minor) limitations on brake feel/pedal feel that possibly occur as a result of the unlinking are imperceptible or hardly perceptible by the driver because of their low magnitude, and are thus tolerable. The unlinking of braking input element 16 from brake master cylinder 10 can be embodied by way of an advantageous definition of the first minimum brake application distance in such a way that it lies in particular in brake actuation regions in which a generator is often used for regenerative braking. For example, the first minimum brake application distance can be defined by way of an advantageous maximum width b of gap 18 in such a way that a higher generator braking torque can be exerted, even during unlinking, on at least one wheel of the vehicle without exceeding a target deceleration of the vehicle predefined by the driver. In particular, the maximum width b of gap 18 can correspond at least to the brake application distance s necessary for maximum regenerative deceleration.

Further possibilities for advantageously designing the first minimum brake application distance are also recited below.

A particularly advantageous embodiment of the external-force braking device for economical implementation of the coupling apparatus will be discussed in more detail below:

Control device 20 is preferably designed to displace output piston 12, upon a displacement of input piston 14 out of its initial position s0, at the predefined braking displacement speed v0 in a direction directed away from input piston 14. Upon an actuation of braking input element 16, gap 18 present between pistons 12 and 14 becomes smaller by a difference that is definable at least via the braking displacement speed v0 and the displacement speed v of input piston 14. The difference can also be increased if the motor (electric motor) of gear drive 22 is set in motion only with a time delay (governed by signal latency times and computation times).

The dynamics of output rod 12 (braking displacement speed v0) depend on the gearing and motor dimensioning of gear drive 22, and can be designed so that a closure of gap 18, and thus a nonpositive engagement between pistons 12 and 14, takes place only as of a displacement of input piston 14 over a definable (advantageous) takeup distance. The possibility thus exists, by way of an advantageous definition of the at least one braking displacement speed v0 or by way of an advantageous application of control to gear drive 22 by control signal 26 outputted from control device 20, of achieving preferred values for at least the first minimum brake application distance and the second minimum brake application distance.

In a preferred embodiment, output piston 12 is displaceable by way of the external-force braking device at a first maximum displacement speed for braking displacement speed v0 which is less than a second maximum displacement speed for the displacement speed v of input piston 14 displaced out of its initial position s0. This ensures that as a result of an actuation of braking input element 16 at a maximum actuation speed at which input piston 14 is displaceable at the second maximum displacement speed, the coupling apparatus is automatically conveyable out of the first operating mode into the second operating mode.

This can be restated as follows: a displacement of input piston 14 at a displacement speed v less than a limit displacement speed predefined by the first maximum displacement speed of output piston 12 brings about a closing of gap 18 for a greater displacement distance s of input piston 14. Conversely, a displacement of input piston 14 at a displacement speed v greater than the predefined limit displacement speed brings about a closing of gap 18 for a smaller displacement distance s of input piston 14. Displacement of input piston 14 at a displacement speed v less than the limit displacement speed, or a corresponding actuation of braking input element 10, thus already causes the coupling apparatus to be conveyed automatically into the first operating mode. Upon an actuation of braking input element 16 corresponding to a displacement speed v greater than the predefined limit displacement speed, the coupling apparatus is automatically conveyed into the second operating mode. With the coupling apparatus described here, the unlinking between pistons 12 and 14 can thus be (automatically) abolished as a function of the actuation speed of braking input element 10 via a rapid actuation of braking input element 16 by the driver, without requiring for this purpose an electronic/sensor suite to ascertain the actuation speed of braking input element 16. The energy applied by the driver (driver braking force Ff) in the context of the rapid actuation of braking input element 16 can simultaneously be used for braking. In the context of the coupling apparatus described here, the unlinking and linking of braking input element 16 to and from brake master cylinder 10 are entirely passive, i.e. without application of control to an additional actuator suite. This ensures that as a result of a linkage of braking input element 16 to brake master cylinder 10 in actuation instances in which high performance by the braking system is required, and the driver therefore intuitively executes a rapid actuation of braking input element 16, the driver braking force Ff is also used to (rapidly) build up the advantageous brake pressure in the at least one wheel brake cylinder. The electrical output power to be made available by the external-force braking system can in addition thereby be considerably reduced. This permits a more economical design of the external-force braking device thanks to the present invention.

In the embodiment depicted, the coupling apparatus has a hydraulic housing 35 having at least one internal chamber 36 of water-tight configuration into which at least one segment, directed away from braking input element 16, of input piston 14, and one segment, directed away from the brake master cylinder, of output 12 project. Internal chamber 36 is preferably filled at least in part with a fluid, preferably with the hydraulic fluid (brake fluid) of the at least one brake circuit hydraulically connected to brake master cylinder 10. By way of a suitable embodiment of the walls of internal chamber 36 it is possible to ensure that no fluid emerges at the contact surfaces of the walls with pistons 12 and 14. Embodiment of a "variable takeup distance" in a fluid achieves the advantages, described in more detail below, as compared with an embodiment of the takeup distance as an "air gap." The coupling apparatus described here is, however, not limited to a disposition of pistons 12 and 14 in hydraulic housing 35 filled with a fluid.

Advantageously, the coupling apparatus also has a pedal simulator 30. Pedal simulator 30 can be embodied as a piston-cylinder unit, for example as a plunger. Pedal simulator 30 can be connected via a first conduit 31 to internal chamber 36. The disposition of pistons 12 and 14 in internal chamber 36 filled with fluid makes possible this economically achievable embodiment of pedal simulator 30 as a piston-cylinder unit. An inward displacement of input piston 14 into internal chamber 36 brings about, in this case, a shifting of fluid out of internal chamber 36 into pedal simulator 30 against the return force acting on the piston of the piston-cylinder unit. The driver thus feels a return force counteracting his or her actuation of braking input element 16, even upon an actuation in which output piston 12 still remains in its initial position even though the input piston is being co-displaced. This ensures an advantageous brake feel for the driver upon actuation of braking input element 16, even before the takeup distance is closed up.

Pedal simulator 30 embodied as a piston-cylinder unit preferably has a nonlinear spring characteristic that corresponds to a standard (advantageous) brake characteristic. In this case the driver has the usual braking feel upon actuation of braking input element 16, even though output piston 12 remains in its initial position.

In particular, pedal simulator 30 and internal chamber 36 can be hydraulically connected via at least one second conduit 34 to a braking medium reservoir 28 (brake fluid reserve container) connected to brake master cylinder 10. The hydraulic fluid of brake master cylinder 10 and of the at least one brake circuit can thus be used to fill internal chamber 36.

In an advantageous refinement, pedal simulator 30 and internal chamber 36 are also connected hydraulically via a further valve 32 to braking medium reservoir 28. Alternatively to braking medium reservoir 28, pedal simulator 30 and internal chamber 36 can also be hydraulically connected via valve 32 and second conduit 34, to another counterpressure-free hydraulic fluid storage volume.

In the instances described above, a differential pressure p between a pressure in internal chamber 36 and a pressure in braking medium reservoir 28, in the counterpressure-free hydraulic fluid storage volume, and/or atmospheric pressure can be established, by way of pedal simulator 30 and/or control valve 32. The differential pressure p can, in particular, be established in such a way that the following equations (Eq 1) and (Eq 2) apply to the simulator counterforce Fs exerted on braking actuation element 16:

$$Fs = p \cdot A; \tag{Eq 1}$$

$$Fs + Fsys = Fk, \tag{Eq 2}$$

where A corresponds to an area of input piston 14 projecting into internal chamber 36 and Fsys to a system feedback force resulting form spring forces of the springs disposed in hydraulic housing 35 and/or from frictional forces, and Fk is the characteristic curve of braking input element 16 (pedal characteristic curve).

In this case the driver perceives, upon an actuation of braking input element 16, a counterforce made up of a sum of the system feedback force Fsys of output rod 12 and a simulator counterforce Fs. Equations (Eq 1) and (Eq 2) apply both in the case of a closed valve 32 and in the case where a connection of pedal simulator 30 to braking medium reservoir 28 by way of second conduit 34 and valve 32 is omitted.

If valve 32 is present in open fashion, the fluid volume shifted out of internal chamber 36 upon a displacement of input piston 14 can be transferred in counterpressure-free fashion into braking medium reservoir 28 or into a corresponding hydraulic fluid storage volume. The opening of valve 32 creates a connection between internal chamber 36 and braking medium reservoir 28 or the hydraulic fluid storage volume, and brings about, so to speak, a bypass of simulator 30. For an open valve 32, equation (Eq 3) therefore applies:

$$Fs \rightarrow 0. \tag{Eq 3}$$

After an opening of valve 32, the driver thus has the capability of executing the brake actuation rapidly and with a relatively low energy expenditure. In particular, in this case the driver can close up the takeup distance rapidly and with little energy expenditure.

Valve 32 is preferably a valve that is open at zero current, which can be electrically controlled at least into an open mode and into a closed mode. An economical example of valve 32 is a switching valve/cutoff valve open at zero current. The zero-current-open embodiment of valve 32 guarantees the advantage that valve 32 is automatically opened in the event of a functional impairment and/or a failure of the electronics of the braking system. In such a situation the driver can thus easily close up the takeup distance and bring the vehicle to a halt with a comparatively low braking force.

In an advantageous refinement, control device 20, or an additional control system of the braking system, can be embodied in such a way that by way of control device 20 or the control system, valve 32 can be electrically controlled, in consideration of at least one variable/datum with respect to an actuation speed of the actuation of the braking input element, a change over time in the actuation speed, the driver braking force, a change over time in the driver braking force, an actuation of the accelerator pedal, a change over time in the actuation of the accelerator pedal, a change over time in the actuation speed of the actuation of the accelerator pedal, a state of at least one vehicle component of the vehicle, a change over time in the state, at least one driving style of the vehicle, a change over time in the driving style, a traffic situation, and/or an environmental situation, by way of a further control signal 38. Another way to restate this is that control is applied to valve 32 as a function of at least one braking system condition, vehicle condition, and/or environmental condition. Examples of a variable/datum with respect to an actuation speed of the actuation of the braking element, a change over time in the actuation speed, the driver braking force, a change over time in the braking force have already been recited above. A state variable of a component of the regenerative braking system that is taken into consideration can be, for example, a charge state of the battery and/or an operating mode of a generator. The at least one variable of control device 20/the control system taken into consideration can likewise encompass a vehicle speed, a vehicle direction, a change in vehicle direction, and/or a yaw rate. A variable with respect to a traffic situation and/or an environmental situation can in addition be a warning signal made available by a vehicle-internal environmental sensing system, for example by an ACC system, a radar system, and/or an airbag triggering system. Based on the characteristic variables listed here, it is possible to detect reliably whether the driver prefers an abrupt deceleration of the vehicle or a slow deceleration of the vehicle. Based on these variables it is also possible to detect whether, as a result of the current situation, highly dynamic deceleration of the vehicle is more important than the energy recovered in the context of regeneration and/or than the convenience of the blending operation.

With a refinement of this kind the possibility exists, in particular in the context of a dynamic/rapid actuation of the brake, a sudden interruption of accelerator pedal actuation, a relatively high vehicle speed, and/or upon recognition of a hazardous situation, of reducing the counterforce acting on braking input element 16 and thus reducing the energy demand on the driver in the context of the braking operation and/or enabling more rapid deceleration of the vehicle.

In another refinement, valve 32 can also be a continuously positionable/controllable/switchable valve. Control device 20/the control system can in this case be embodied to control valve 32 into a specific opening state in consideration of at least one of the variables listed above. This ensures a more rapid variation of the counterforce acting on braking input element 16. For example, valve 32 can be briefly opened during an actuation of braking input element 16 in order to ensure a particularly advantageous braking feel for the driver. The usability of the coupling apparatus is, however, not limited to the provision of valve 32 and a control device 20 coacting therewith.

Figure 2:
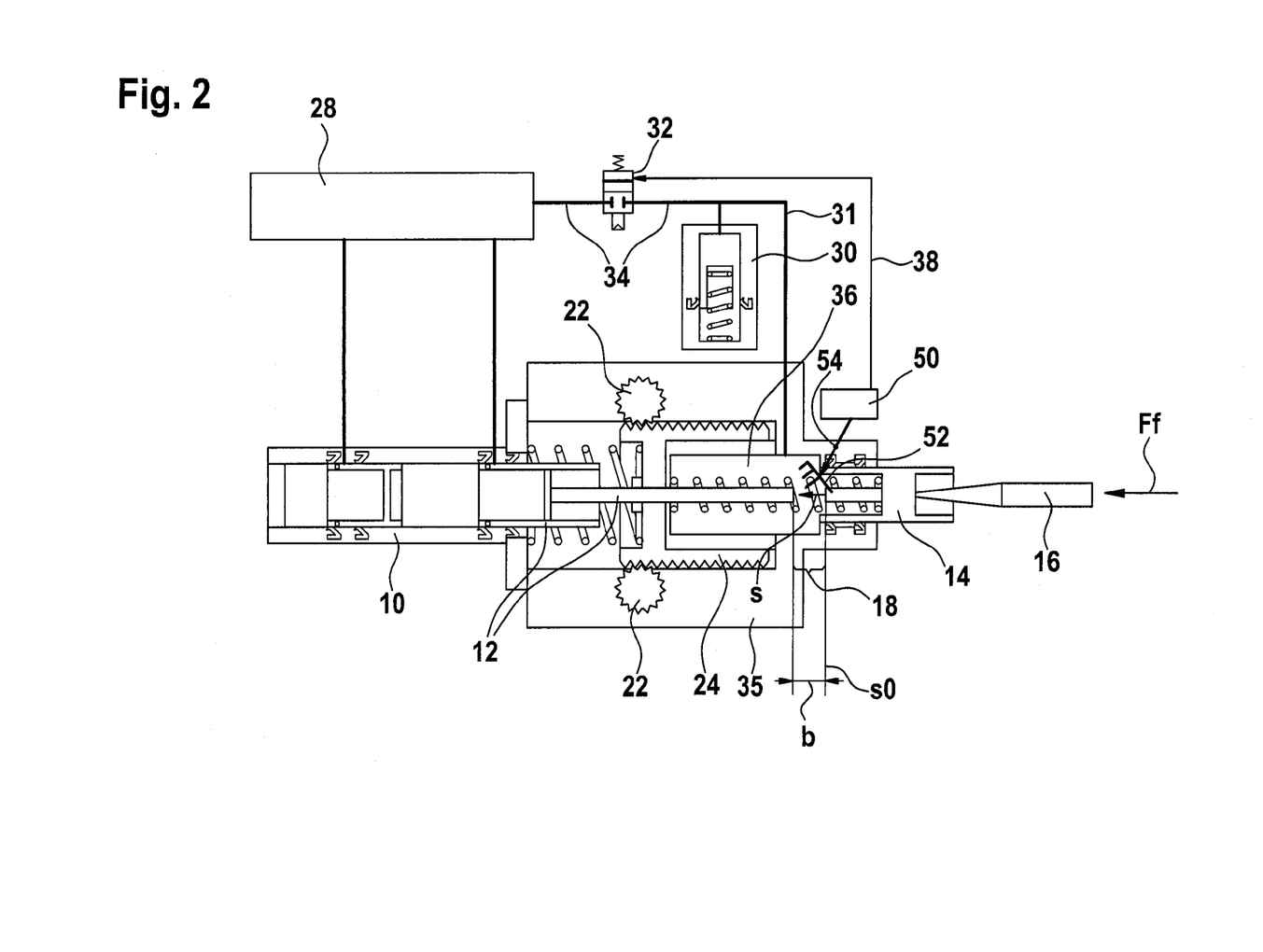
FIG. 2 schematically depicts a second embodiment of the coupling apparatus.

FIG. 2 schematically depicts a second embodiment of the coupling apparatus.

The coupling apparatus schematically depicted in FIG. 2 exhibits no/almost no deviations from the embodiment described above, except for the design of the external-force braking device. Components 10 to 16, 22, 24, and 28 to 36 are therefore not described again.

Alternatively or in addition to the embodiment described above, the coupling apparatus of FIG. 2 encompasses a control device 50 with the aid of which the coupling apparatus is conveyable out of at least the first operating mode having the first minimum brake application distance into at least the second operating mode having the second minimum brake application distance less than the first minimum brake application distance. The coupling apparatus can likewise be conveyable with the aid of control device 50 out of at least the second operating mode into at least the first operating mode. Control device 50 is designed to take into consideration, when controlling the coupling apparatus between the at least two operating modes, at least one variable with respect to an actuation speed of the actuation of the braking input element, a change over time in the actuation speed, the displacement speed of input piston 14, a change over time in the displacement speed, the driver braking force Ff, a change over time in the driver braking force Ff, a state of at least one vehicle component of the vehicle, a change over time in the state, at least one driving style of the vehicle, and/or a change over time in the driving style. At least one variable with respect to a state and/or a change over time in the state of a component of a regenerative braking system can be taken into consideration as the at least one variable. A state variable of this kind of a component of the regenerative braking system can be, for example, a charge state of the battery and/or an operating mode of a generator.

The at least one variable can also encompass a vehicle speed, a vehicle direction, a change in vehicle direction, and/or a yaw rate. Variables independent of the actuation of braking input element 16 can thus also be taken into consideration/evaluated for the definition of an advantageous operating mode of the coupling apparatus. Because capabilities for making the variables listed here available to control device 50 by way of a sensor and/or by way of an information output device are known, there will be no further discussion thereof.

In the embodiment depicted, control device 50 is additionally designed to apply control to an actuator (not depicted) of a force transfer component 52, by way of a control signal 54, in such a way that force transfer component 52 is conveyed out of a retracted position of the first operating mode into a least one extended position at least of the second operating mode. The coupling apparatus is thus switchable, by way of an extension of force transfer component 52, out of the first operating mode into at least the second operating mode. The coupling apparatus can correspondingly be switched out of at least the second operating mode into the first operating mode by way of a retraction of force transfer component 52.

In the first operating mode, a force transfer from input piston 14, displaced out of its initial position s0 over a brake application distance s between the second minimum brake application distance and the first minimum brake application distance, to output piston 12 is suppressed by force transfer component 52 controlled into the retracted position. In the second operating mode, conversely, the driver braking force Ff is transferrable from input piston 14, displaced out of its initial position s0 over a brake application distance s between the second minimum brake application distance and the first minimum brake application distance, to output piston 12 by way of force transfer component 52 controlled into an extended position. Force transfer component 52 can be mounted displaceably either on output piston 12 or on the input piston.

In the second operating mode, the driver braking force Ff can thus be transferred via the (extended) force transfer component 52 to output piston 12 even though input piston 14 itself is not touching/contacting output piston 12. Control can likewise be applied to the actuator of force transfer component 52 by way of control signal 54 in such a way that upon a retraction of force transfer component 52, the nonpositive engagement between the output piston and the input piston, displaced out of its initial position s0 over a brake application distance s between the second minimum brake application distance and the first minimum brake application distance, is abolished.

Force transfer component 52 can also be referred to as an "actively switchable interlock." For example, force transfer component 52 is embodied as a pawl. Force transfer component 52 can also be embodied so that it has multiple interlocking stages, for example as a multi-step pawl. The coupling apparatus can thus have, in addition to the first operating mode and the second operating mode, at least a third operating mode having a third minimum brake application distance less than the second minimum brake application distance.

A force transfer component 52 implemented as a pawl is preferably in the retracted position in the unenergized (zero-current) state. A force transfer component 52 of this kind is preferably unlockable, i.e. conveyable into the at least one extended state, via an electromagnet. In the event of a failure of the external-force braking device or its power supply, the coupling apparatus is thus automatically switchable into a mode having a shorter brake distance.

Control device 50 can, in addition, optionally be designed to output to valve 32 the control signal 38 already described above.

Figure 3:
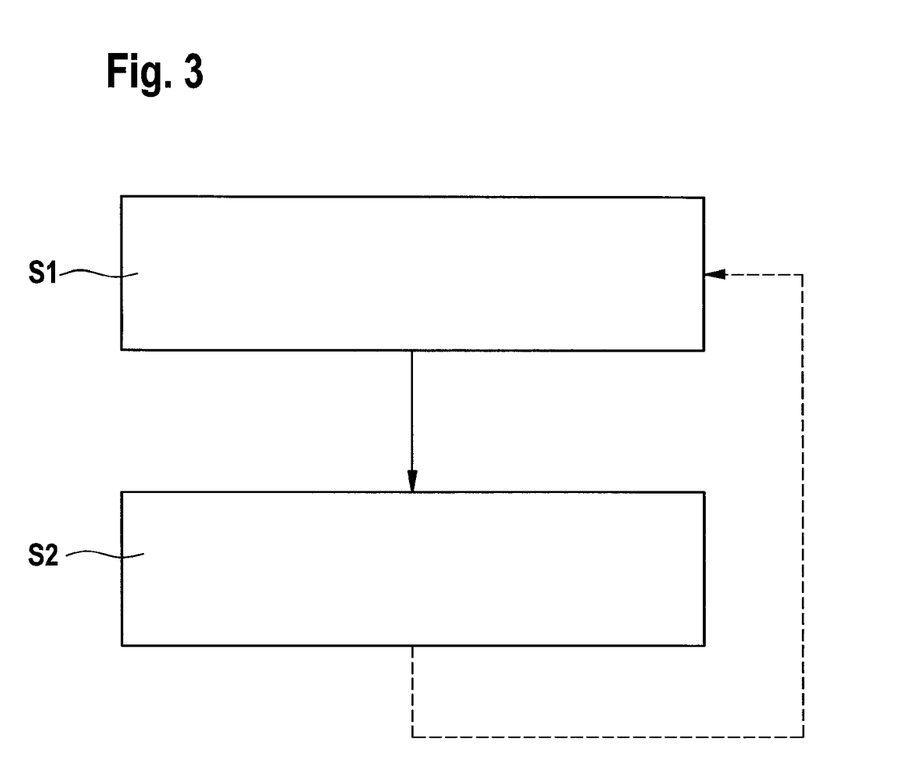
FIG. 3 is a flow chart depicting an embodiment of the method.

FIG. 3 is a flow chart depicting an embodiment of the method.

The method described here is suitable for reliable operation of a coupling apparatus with which a braking input element is connected to a brake master cylinder of a vehicle. The usable coupling apparatus encompasses at least one input piston (co-)displaced upon an actuation of the braking input element out of an initial position over a brake application distance, and an output piston onto which a driver braking force exerted on the braking input element is transferred, via the input piston, displaced out of its initial position over a brake application distance of at least one predefined first minimum brake application distance, in such a way that by way of the driver braking force transferred via the input piston to the output piston, an internal pressure in the brake master cylinder is increased. One of the coupling apparatuses described above can be used, for example, to execute the method.

In a method step S1, the coupling apparatus is operated in a first operating mode in which the input piston, displaced out of its initial position over a brake application distance less than the first minimum brake application distance, is spaced apart from the output piston in such a way that a force transfer from the input piston to the output piston is suppressed. The possibility thus exists, during method step S1, of utilizing the "final linking" of the braking input element from the brake master cylinder in order to activate a generator, without exceeding a target deceleration of the vehicle predefined by the driver.

In a method step S2, the coupling apparatus is conveyed into at least a second operating mode having a second minimum brake application distance less than the first minimum brake application distance. In the second operating mode of the coupling apparatus, the input piston, displaced out of its initial position over a brake application distance less than the second minimum brake application distance, is spaced apart from the output piston in such a way that a force transfer from the input piston to the output piston is suppressed. The driver braking force is, however, transferred via the input piston, displaced out of its initial position over a brake application distance between the second minimum brake application distance and the first minimum brake application distance, to the output piston. This ensures the advantages already described above.

Upon execution of method step S2, at least one variable with respect to an actuation speed of the actuation of the braking input element, a change over time in the actuation speed, the driver braking force, a change over time in the driver braking force, a state of at least one vehicle component of the vehicle, a change over time in the state, at least one driving style of the vehicle, and/or a change over time in the driving style can be ascertained, and the at least one ascertained variable can be taken into consideration upon conveyance of the coupling apparatus into at least the second operating mode. For example, at least one variable with respect to a state and/or a change over time in the state of a component of a regenerative braking system can be taken into consideration. A vehicle speed, a vehicle direction, a change in vehicle direction, and/or a yaw rate can also be taken into consideration as the at least one variable.

In a particularly advantageous embodiment, upon a conveyance of the coupling apparatus out of the first operating mode into at least the second operating mode, a force transfer component is displaced out of a retracted position into at least one extended position. It is possible in this fashion to ensure that the driver braking force is transferred, from the input piston, displaced out of its initial position over a brake application distance between the second minimum brake application distance and the first minimum brake application distance, to the output piston via the force transfer component displaced into the at least one extended position.

At a later point in time, method step S1 can be repeated by switching over the coupling apparatus.

What is claimed is:

1. A coupling apparatus for connecting a braking input element to a brake master cylinder of a vehicle, comprising:
    an input piston disposed on the braking input element in such a way that upon actuation of the braking input element, the input piston is displaced out of an initial position over a brake application distance; and
    an output piston to which a driver braking force exerted onto the braking input element is transferred via the input piston displaced out of the initial position over at least one predefined first minimum brake application distance, the output piston being disposed on the brake master cylinder in such a way that an internal pressure in the brake master cylinder is increased by way of the driver braking force transferred via the input piston to the output piston;
    wherein, at least in a first operating mode of the coupling apparatus, the input piston displaced out of the initial position over a brake application distance less than the predefined first minimum brake application distance is spaced apart from the output piston in such a way that a force transfer from the input piston to the output piston is suppressed;
    wherein, at least in a second operating mode of the coupling apparatus having a predefined second minimum brake application distance less than the predefined first minimum brake application distance, the input piston displaced out of the initial position over a brake application distance less than the predefined second minimum brake application distance is spaced apart from the output piston in such a way that a force transfer from the input piston to the output piston is suppressed, and the driver braking force is transferred via the input piston displaced out of the initial position over a brake application distance between the predefined second minimum brake application distance and the predefined first minimum brake application distance, to the output piston.

2. The coupling apparatus as recited in claim 1, further comprising:
an external-force braking device by way of which an external force is additionally transferred to the output piston in such a way that the internal pressure in the brake master cylinder is increased by the external force transferred to the output piston.

3. The coupling apparatus as recited in claim 2, further comprising:
a control device configured to control selective switching of the coupling apparatus into one of the first or second operating mode, taking into consideration at least one variable with respect to at least one of an actuation speed of the braking input element, a change over time in the actuation speed of the braking input element, the driver braking force, a change over time in the driver braking force, a state of at least one vehicle component, a change over time in the state of the at least one vehicle component, at least one driving style of the vehicle, and a change over time in the driving style of the vehicle.

4. The coupling apparatus as recited in claim 3, further comprising:
a hydraulic housing having an internal chamber at least partly filled with a fluid, wherein the input piston and the output piston at least partly project into the internal chamber.

5. The coupling apparatus as recited in claim 4, wherein the internal chamber of the hydraulic housing is hydraulically connected via at least one first conduit to a pedal simulator configured as a piston-cylinder unit.

6. The coupling apparatus as recited in claim 5, wherein at least one of the internal chamber of the hydraulic housing and the pedal simulator is hydraulically connected via at least one second conduit and a valve to a counterpressure-free hydraulic fluid storage volume.

7. The coupling apparatus as recited in claim 6, wherein the control device configured to selectively switch the valve into at least one of an opened state and a closed state, taking into consideration at least one variable with respect to at least one of an actuation speed of the braking input element, a change over time in the actuation speed of the braking input element, the driver braking force, a change over time in the driver braking force, an actuation of the accelerator pedal, a change over time in the actuation of the accelerator pedal, a change over time in the actuation speed of the actuation of the accelerator pedal, a state of at least one vehicle component, a change over time in the state of the at least one vehicle component, at least one driving style of the vehicle, a change over time in the driving style of the vehicle, a traffic situation, and an environmental situation.

8. The coupling apparatus as recited in claim 5, wherein the pedal simulator configured as a piston-cylinder unit has a nonlinear spring characteristic corresponding to a brake characteristic.

9. The coupling apparatus as recited in claim 3, further comprising:
a force transfer component, wherein the control device is configured to control the force transfer component out of a retracted position into at least one extended position in such a way that: (i) in the first operating mode a force transfer from the input piston, displaced out of the initial position over a brake application distance between the predefined second minimum brake application distance and the predefined first minimum brake application distance, to the output piston is suppressed; and (ii) in the second operating mode the driver braking force is transferred from the input piston, displaced out of the initial position over a brake application distance between the predefined second minimum brake application distance and the predefined first minimum brake application distance, to the output piston via the force transfer component controlled into the at least one extended position.

10. The coupling apparatus as recited in claim 9, wherein the force transfer component includes a multi-step pawl.

11. The coupling apparatus as recited in claim 3, wherein the control device is configured to take into consideration at least one variable with respect to at least one of a state of a component of a regenerative braking system and a change over time in the state of the component of the regenerative braking system for the control of the selective switching of the coupling apparatus.

12. The coupling apparatus as recited in claim 3, wherein the control device is configured to take into consideration at least one of a vehicle speed, a vehicle direction, a change in vehicle direction, and a yaw rate for the control of the selective switching of the coupling apparatus.

13. The coupling apparatus as recited in claim 3, wherein the coupling apparatus is part of a vehicle braking system.

14. The coupling apparatus as recited in claim 2, wherein the output piston is displaced by the external-force braking device at a first maximum displacement speed which is less than a second maximum displacement speed of the input piston displaced out of the initial position, so that by actuation of the braking input element at a maximum actuation speed at which the input piston is displaced at the second maximum displacement speed, the coupling apparatus is switched automatically out of the first operating mode into the second operating mode.

15. A method for operating a coupling apparatus with which a braking input element is connected to a brake master cylinder of a vehicle, the coupling apparatus having (i) an input piston disposed on the braking input element in such a way that upon actuation of the braking input element, the input piston is displaced out of an initial position over a brake application distance, and (ii) an output piston to which a driver braking force exerted onto the braking input element is transferred via the input piston displaced out of the initial position over at least one predefined first minimum brake application distance, the output piston being disposed on the brake master cylinder in such a way that an internal pressure in the brake master cylinder is increased by way of the driver braking force transferred via the input piston to the output piston, the method comprising:
operating the coupling apparatus in a first operating mode in which the input piston displaced out of the initial position over a brake application distance less than the predefined first minimum brake application distance is spaced apart from the output piston in such a way that a force transfer from the input piston to the output piston is suppressed; and
selectively switching the coupling apparatus into at least a second operating mode having a second minimum brake application distance less than the first minimum brake application distance, wherein in the second operating mode the input piston displaced out of the initial position over a brake application distance less than the predefined second minimum brake application distance is spaced apart from the output piston in such a way that a force transfer from the input piston to the output piston is suppressed, and the driver braking force is transferred via the input piston displaced out of the initial position over a brake application distance between the predefined second minimum brake application distance and the predefined first minimum brake application distance, to the output piston.

16. The method as recited in claim 15, wherein the coupling apparatus is selectively switched into the at least one second operation mode, taking into consideration at least one variable with respect to at least one of an actuation speed of the braking input element, a change over time in the actuation speed of the braking input element, the driver braking force, a change over time in the driver braking force, a state of at least one vehicle component, a change over time in the state of the at least one vehicle component, at least one driving style of the vehicle, and a change over time in the driving style of the vehicle.

17. The method as recited in claim 16, wherein the coupling apparatus is selectively switched into the at least one second operation mode, taking into consideration at least one variable with respect to at least one of a state of a component of a regenerative braking system and a change over time in the state of a component of a regenerative braking system.

18. The method as recited in claim 16, wherein the coupling apparatus is selectively switched into the at least one second operation mode, taking into consideration at least one variable with respect to at least one of a vehicle speed, a vehicle direction, a change in vehicle direction, and a yaw rate.

19. The method as recited in claim 15, wherein a force transfer component of the coupling apparatus is displaced, upon switching of the coupling apparatus out of the first operating mode into at least the second operating mode, out of a retracted position into at least one extended position in such a way that the driver braking force is transferred via the input piston displaced out of the initial position over a brake application distance between the predefined second minimum brake application distance and the predefined first minimum brake application distance, to the output piston via the force transfer component displaced into the at least one extended position.

20. The method as recited in claim 15, further comprising:
ascertaining at least one variable with respect to at least one of an actuation speed of the braking input element, a change over time in the actuation speed of the braking input element, the driver braking force, a change over time in the driver braking force, an actuation of the accelerator pedal, a change over time in the actuation of the accelerator pedal, a change over time in the actuation speed of the actuation of the accelerator pedal, a state of at least one vehicle component, a change over time in the state of the at least one vehicle component, at least one driving style of the vehicle, a change over time in the driving style of the vehicle, a traffic situation, and an environmental situation; and
wherein the coupling apparatus includes a hydraulic housing having an internal chamber at least partly filled with a fluid, wherein the input piston and the output piston at least partly project into the internal chamber, and wherein the internal chamber of the hydraulic housing is hydraulically connected via a valve to a counterpressure-free hydraulic fluid storage volume, and wherein the valve is selectively switched into at least one of an opened state and a closed state, taking into consideration the at least one variable.

* * * * *